United States Patent [19]

Rutan

[11] Patent Number: 4,614,320

[45] Date of Patent: Sep. 30, 1986

[54] AIRCRAFT WING FLAP

[76] Inventor: Elbert L. Rutan, 39820 Golfers Dr., Palmdale, Calif. 93551

[21] Appl. No.: 593,943

[22] Filed: Mar. 27, 1984

[51] Int. Cl.⁴ ............................................. B64C 9/18
[52] U.S. Cl. ................................... 244/216; 244/218
[58] Field of Search ................ 244/215, 216, 218, 46, 244/213, 219

[56] References Cited

U.S. PATENT DOCUMENTS

| | | | |
|---|---|---|---|
| 1,819,948 | 8/1931 | Diago | 244/46 |
| 2,271,226 | 1/1942 | Johnson | 244/216 |
| 2,306,015 | 12/1942 | Dornier | 244/216 |
| 2,405,726 | 8/1946 | Zap | 244/216 |
| 2,555,862 | 6/1951 | Romani | 244/215 |
| 3,528,632 | 9/1970 | Miles et al. | 244/218 |
| 4,172,575 | 10/1979 | Cole | 244/216 |
| 4,305,177 | 12/1981 | Feifel | 244/215 |

FOREIGN PATENT DOCUMENTS 729783 12/1942 Fed. Rep. of Germany ...... 244/216

Primary Examiner—Galen L. Barefoot
Attorney, Agent, or Firm—Christie, Parker & Hale

[57] ABSTRACT

A support and actuating system for large Fowler-type flaps on the trailing edge of an aircraft wing. Each flap is vertically and laterally supported at diagonally opposite corners, and the remaining leading-edge corner is vertically supported and laterally free to permit smooth and simple actuation. The flap is constructed to be torsionally stiff to eliminate need for conventional multiple flap tracks and support at the remaining trailing-edge corner. Elimination of some or all external tracks on the wing tracks provides a clean low-drag wing when the flaps are retracted in cruising flight, while enabling simple deployment of unusually large flaps for increased lift during landing, takeoff, and other low speed conditions. The flap system is useful on straight or rearwardly swept wings, and is particularly adapted to forwardly swept wings.

17 Claims, 17 Drawing Figures

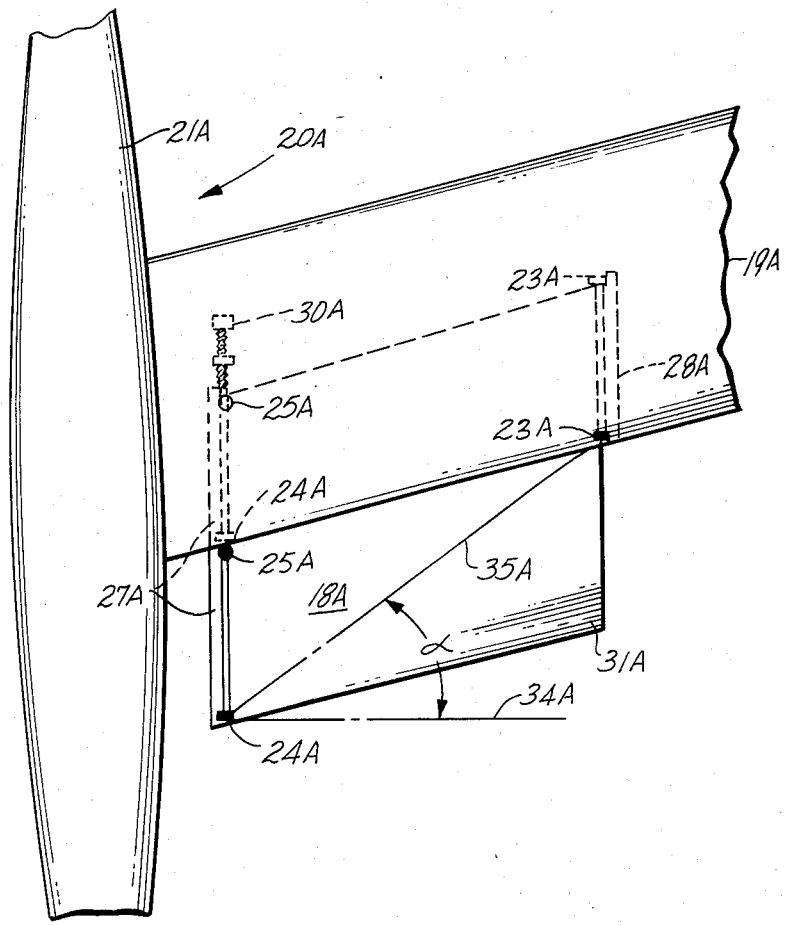

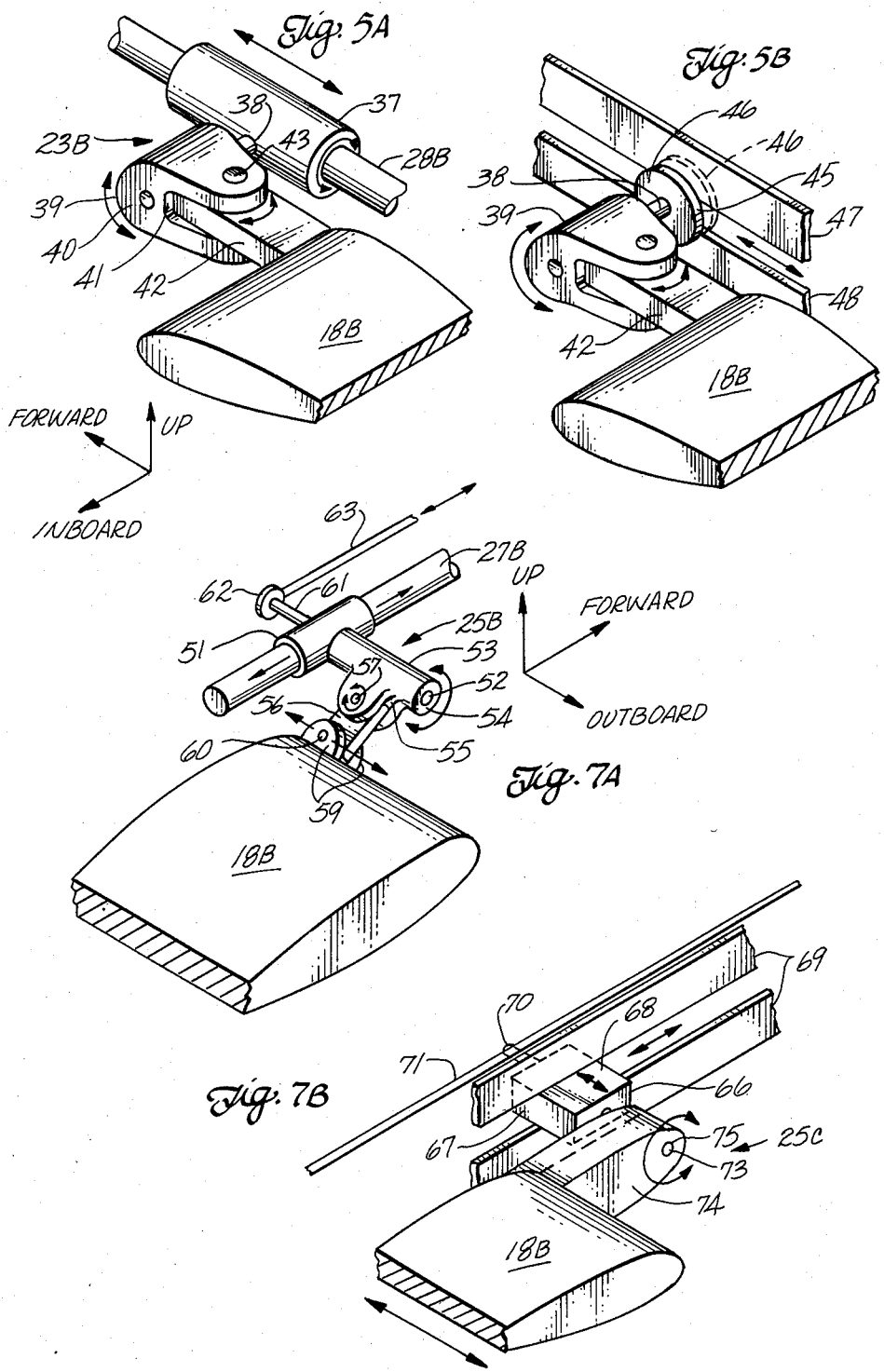

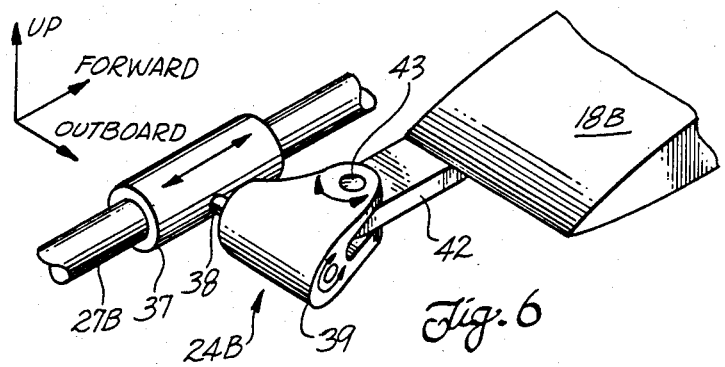
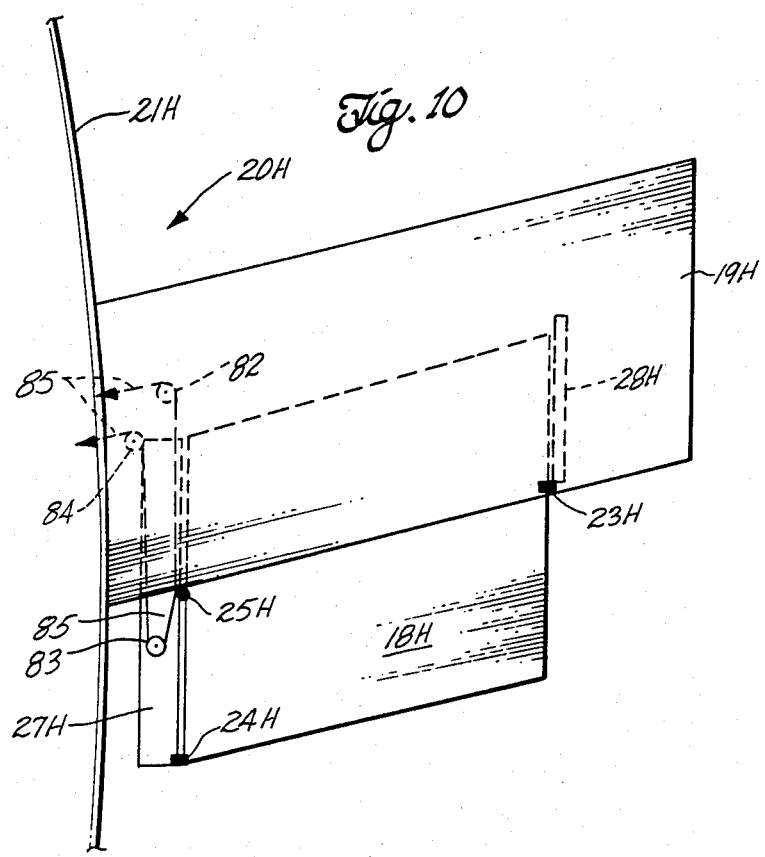

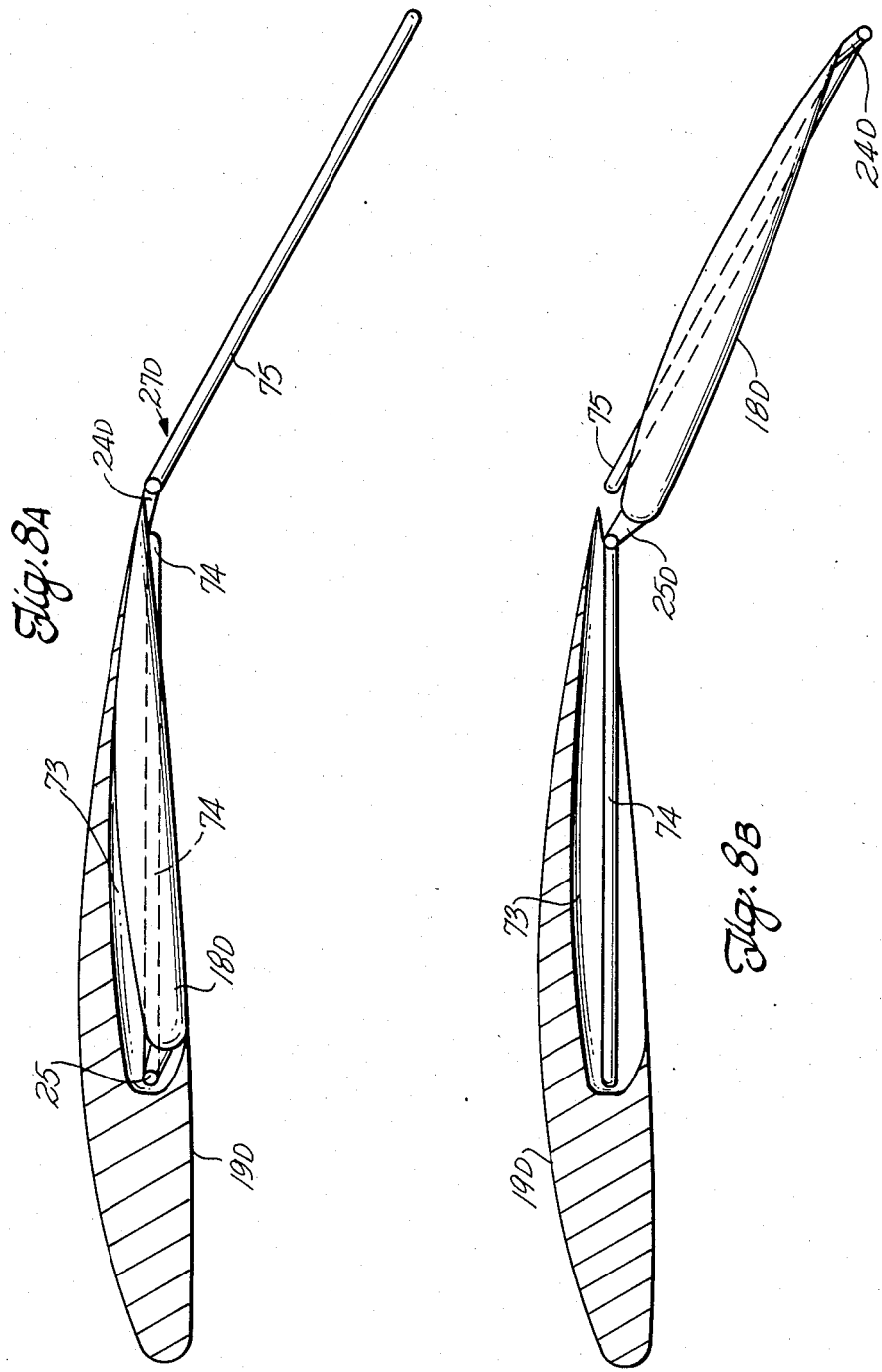

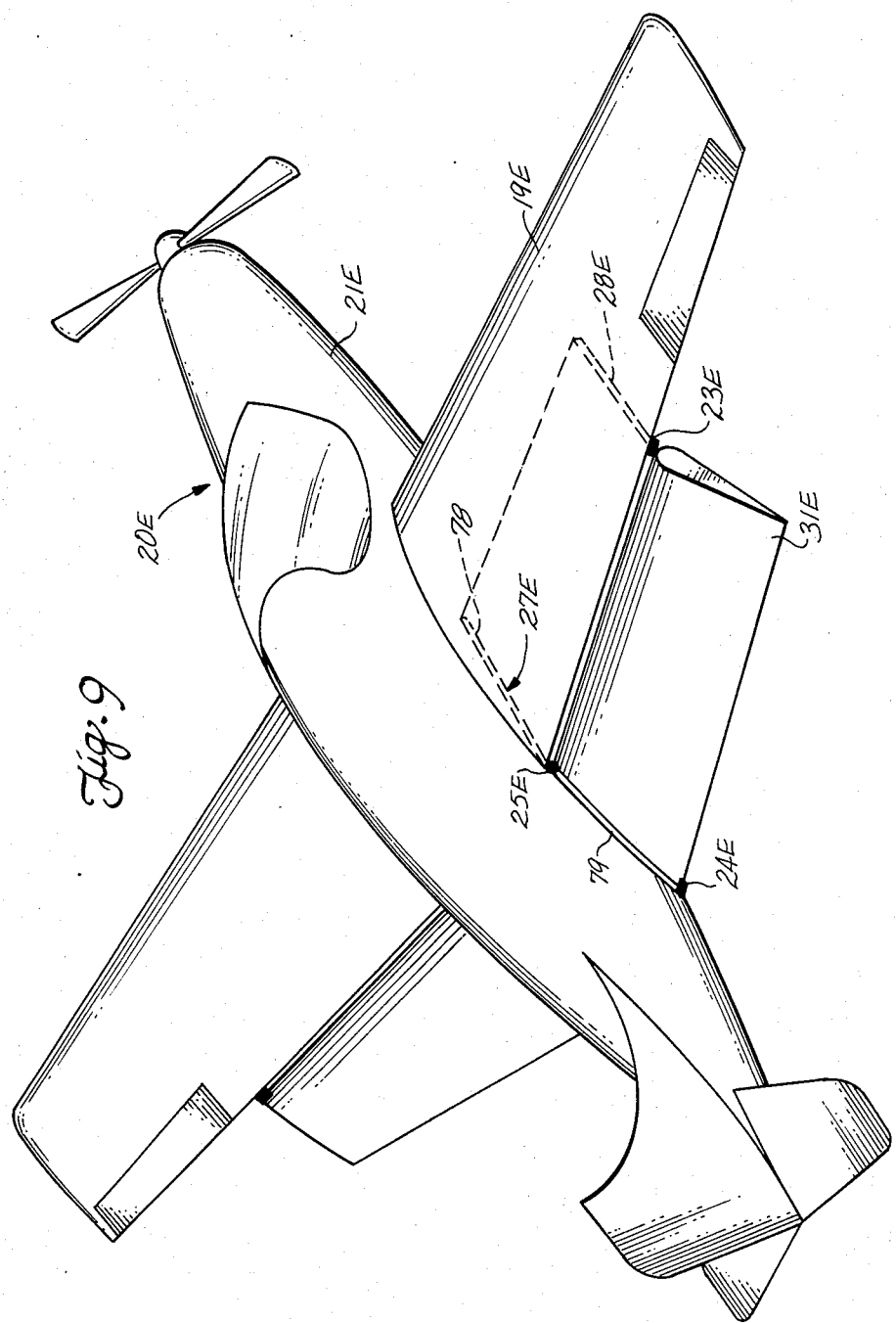

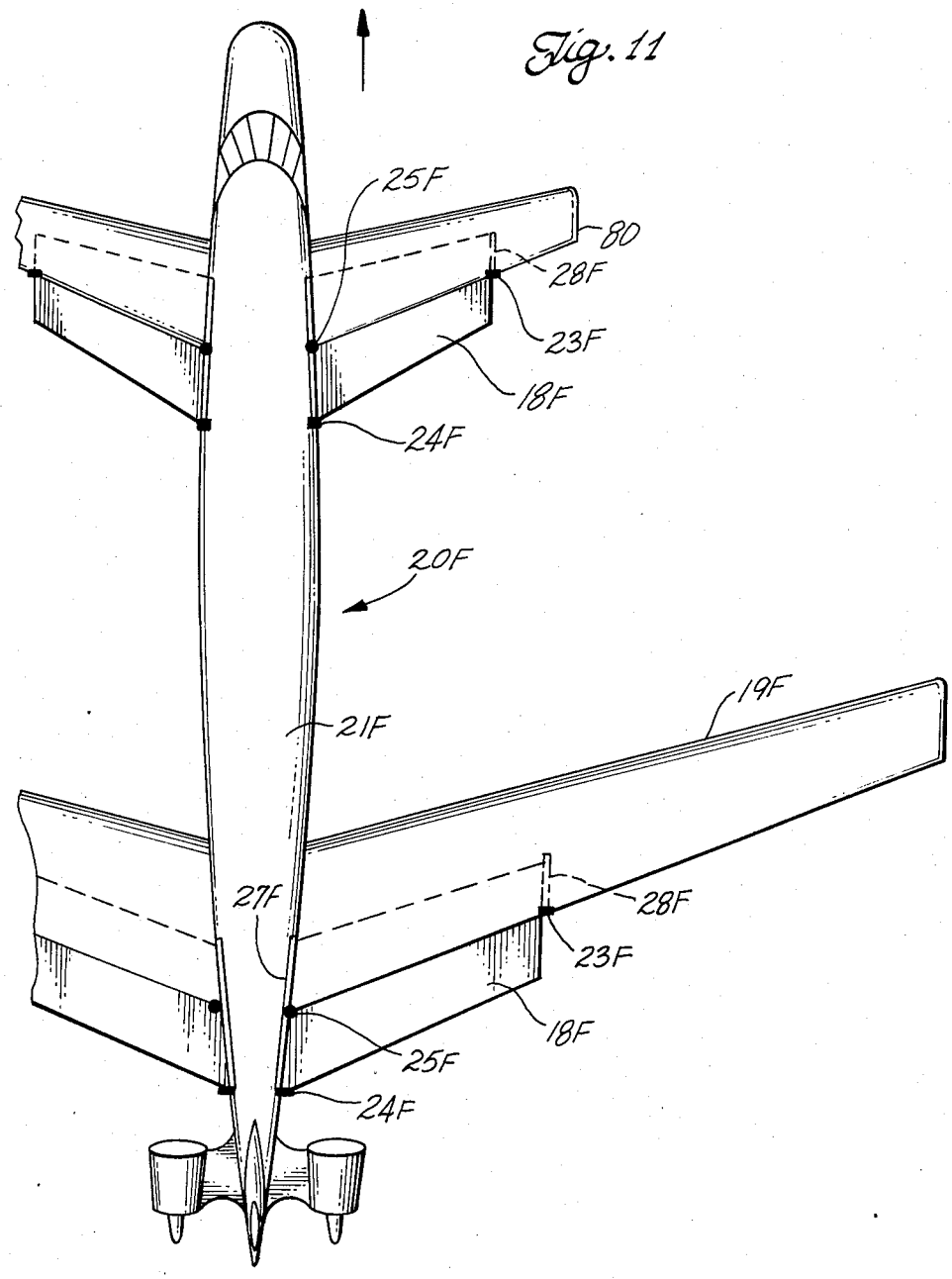

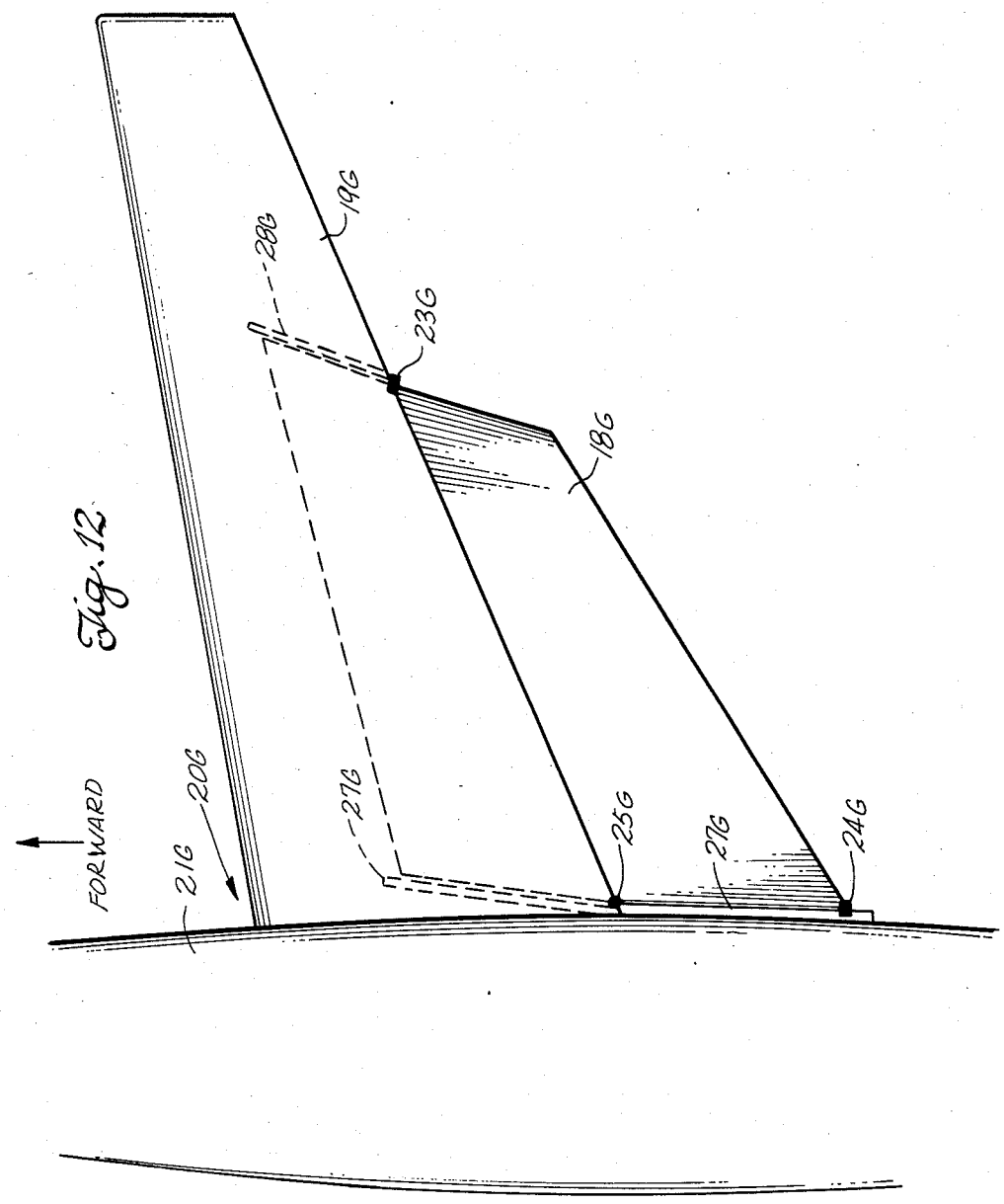

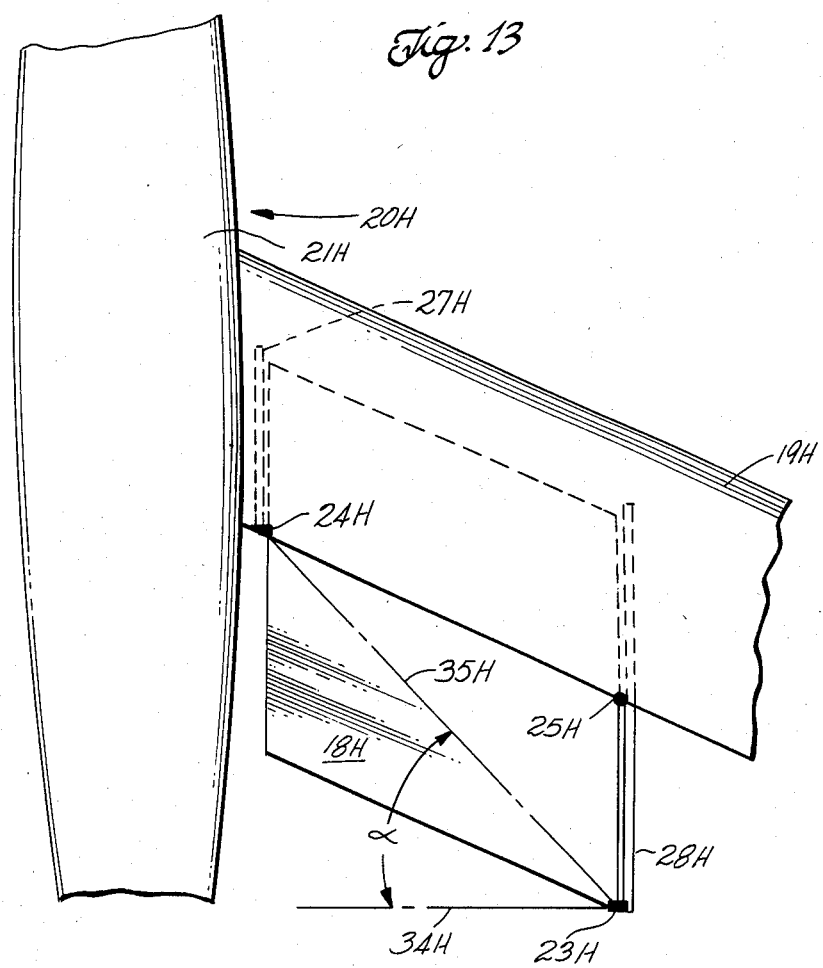

AIRCRAFT WING FLAP

BACKGROUND OF THE INVENTION

Aircraft designers have for many years recognized the need for variable-geometry wings to provide good performance at both upper and lower portions of the aircraft speed range. In high-speed cruising flight, a small-area low-drag wing is needed for optimum performance and ride comfort. A highly loaded cruise-optimized wing of this type, however, is inconsistent with the need for production of high lift for safe operation at low speed during takeoff and landing. Designers accordingly provide aircraft with wings of variable area and contour for good low-speed short-field performance, while still being capable of achieving the desired characteristics during cruising flight.

Variable wing geometry is commonly achieved by providing hinged or otherwise movable flaps at the wing trailing edge. Plain or split flaps sometimes used on small aircraft in effect provide a variable-camber wing for improved low-speed operation. A significant further improvement in low-speed performance is offered by the well-known Fowler-type flap which, when extended, enables a significant increase in wing area and boundary layer control, in addition to the desired increase in wing camber during landing and takeoff.

A Fowler flap is a movable part of the undersurface of the wing trailing or aft portion, and the flap typically extends spanwise from the aircraft fuselage to roughly the midpoint of the wing length. When fully retracted, the flap smoothly completes the contour of a highly loaded wing which is optimized for efficient and comfortable high-speed flight. The flap is extended by being moved rearwardly and downwardly away from the trailing edge of the fixed wing to provide high lift and increased wing area during low-speed flight.

While the Fowler flap is a popular and effective way of achieving variable wing geometry, it has several deficiencies in conventional application. Each Fowler flap is typically provided with two or more fixed supporting and guiding tracks which extend aft from the wing, causing increased aerodynamic drag during cruising flight when the flap is retracted. Flap actuating mechanisms are expensive and complex in that Fowler flaps are usually driven by actuators at inboard and outboard positions, and sometimes by additional actuators at intermediate positions. Multiple synchronized actuators are needed to insure smooth flap deployment without binding arising from construction tolerances, air loads, and temperature changes.

From a practical standpoint, the chord (the fore and aft dimension) of a Fowler flap is commonly limited to perhaps one-fourth or one-third of the wing chord to minimize actuation problems and drag of the supporting flap tracks. If both the mechanical actuation complexity, and the size and number of external flap tracks could be reduced, it would be feasible and desirable to use flaps with a larger chord. For example, a large flap chord in the range of 50 to 75 percent of the wing chord could provide substantial improvement in low-speed performance of a wing which would still be optimized for high-speed retracted-flap operation.

These goals are achieved by the Fowler-flap support and actuation systems of this invention. A new approach to flap support permits elimination of external midspan flap tracks, and only a single external track is needed. This single track preferably is at the wing root, and can be flush mounted in the fuselage for drag minimization. The support system also solves the problem of binding during flap movement, enabling use of a single simple actuator to deploy a wide-chord Fowler flap.

SUMMARY OF THE INVENTION

This invention is directed to lift augmentation surfaces for aircraft, and especially to apparatus for the support and deployment of wide-chord surfaces such as a Fowler-type flap at the aft or trailing edge of an aircraft wing. Inboard and outboard tracks are provided to guide flap movement, and one of the tracks, preferably the outboard track, is substantially contained within the wing. The other track extends behind the wing, and is preferably fuselage mounted for minimum drag, but can also be wing mounted.

The flap is roughly rectangular (or, more generally, quadrilateral) in planform, and has inboard and outboard forward and aft corners. Couplers are provided at three corners of the flap to support and align the flap with respect to the tracks. The couplers at two diagonally opposite corners (e.g., the inboard-aft and outboard-forward corners) provide both vertical (parallel to the aircraft yaw axis) and lateral (parallel to the aircraft pitch axis) support, whereas the third coupler provides vertical support at the remaining forward corner (e.g., the inboard-forward corner) with limited lateral freedom. The remaining aft corner is unsupported, and the flap is provided with torsional stiffness (preferably by using composite materials) to resist twisting forces when deployed.

Preferably, a wide-chord flap is used to provide a relatively large angle (in the range of 30 degrees or more) between a line connecting the two laterally stiff couplers and a line perpendicular to the flap tracks, or perpendicular to the longer aft-extending track if the tracks are not parallel. This geometry enables use of a simple single-point flap actuator without flap binding or chatter during extension or retraction.

BRIEF DESCRIPTION OF THE DRAWINGS

FIG. 4B is a view similar to FIG. 4A, but showing the flap on a forward-swept wing;

FIGS. 5A and 5B show alternate types of couplers at the outboard forward corner of the flap;

FIG. 6 shows a coupler at the inboard aft flap corner;

FIGS. 7A and 7B show alternate types of couplers at the inboard forward flap corner;

FIGS. 8A and 8B are side views showing the new flap in retracted and extended positions;

FIG. 9 is a pictorial view of the new flap as used on a small aircraft;

FIG. 10 is a top view showing an actuation system;

FIG. 11 is a top view of a large jet aircraft with new flap on forward and aft wings;

FIG. 12 is a top view of the flap as supported by nonparallel tracks on a forward-swept wing; and FIG. 13 is a top view of an aircraft with a rearwardly swept wing showing a different arrangement of wing-flap couplers.

DESCRIPTION OF THE PREFERRED EMBODIMENTS

Figure 1:
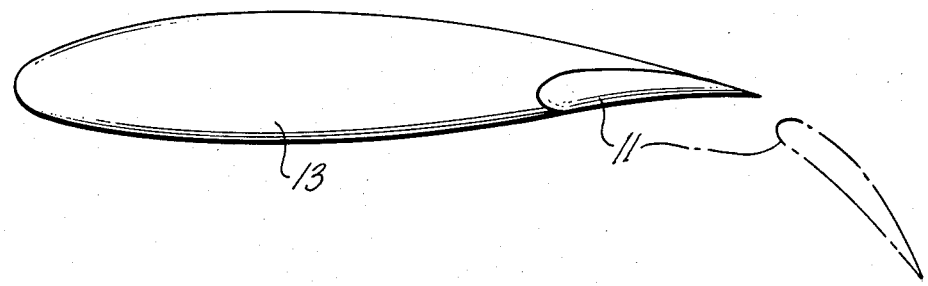
FIG. 1 is a side view of an aircraft wing with a conventional Fowler flap.
Figure 2:
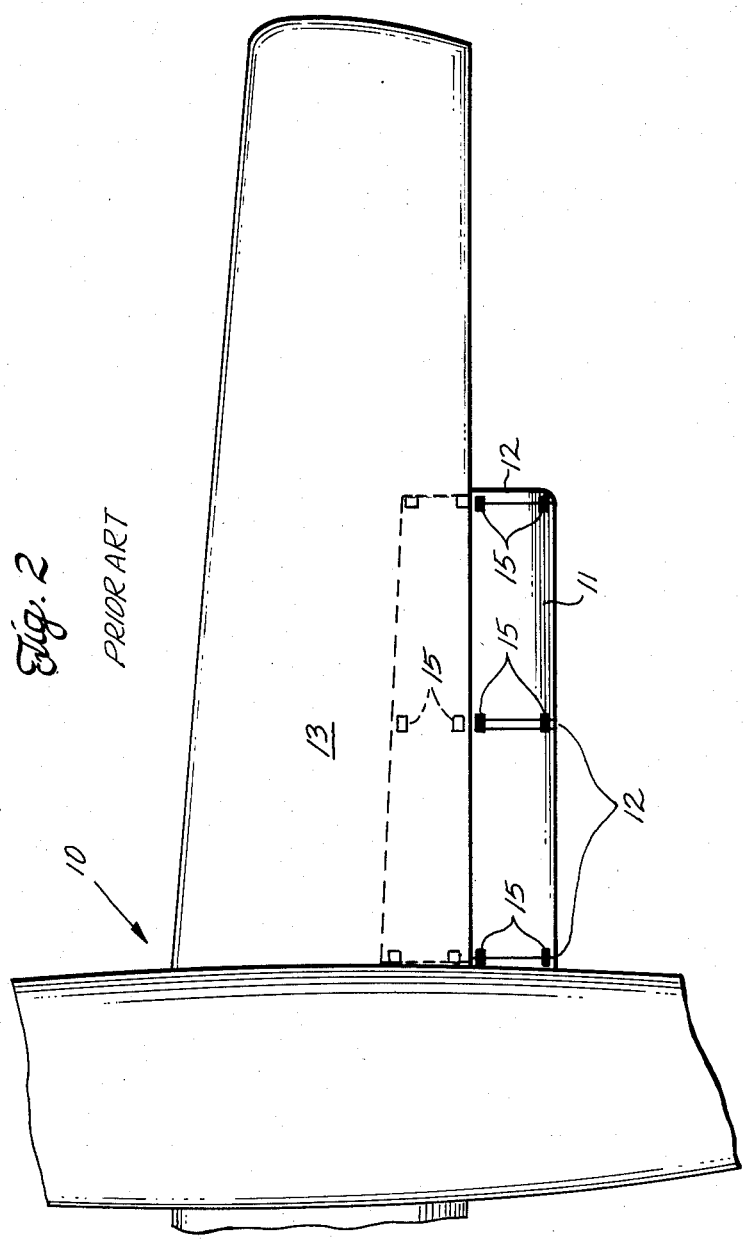
FIG. 2 is a top view of an aircraft with the conventional flap.

FIGS. 1 and 2 illustrate an aircraft 10 with a prior-art Fowler flap 11 shown retracted in solid line and extended in phantom line in FIG. 1. The flap is guided and supported during deployment and when extended by conventional flap tracks 12 extending rearwardly and downwardly from aircraft wing 13. Multiple leadscrew-type or similar actuators (not shown) are mounted within the wing to extend and retract the flap. Rollers or sliders 15 are positioned at all four corners and at mid-span points of the generally rectangular flap to connect the flap to the tracks. The flap has a relatively small chord (roughly one-fourth the wing chord) to minimize the size and drag of tracks 12, and also to lessen the mechanical complexity of the actuation system.

Figure 3:
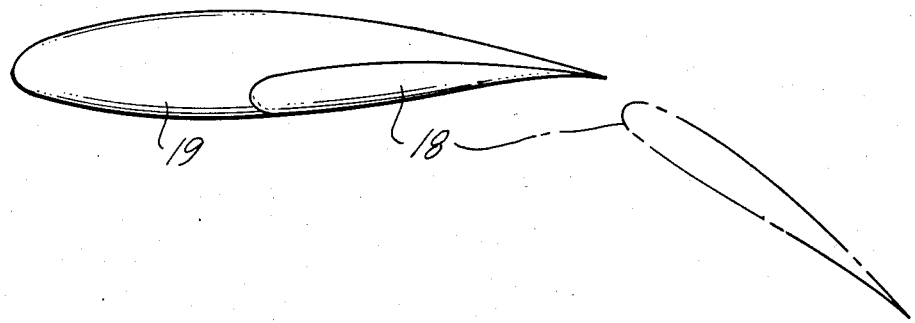
FIG. 3 is a side view of an aircraft wing using the extended-chord flap of this invention.

FIG. 3 shows a wide-chord flap 18 according to the invention as used with an aircraft wing 19. In the retracted position shown in solid line, the flap is tightly sealed against the undersurface of the wing, and the aircraft is in an efficient high-speed cruise condition. The extended flap is shown in phantom line in FIG. 3, and it reconfigures the wing for safe flight at low take-off and landing speeds. Flap 18 has a wide chord (over one-half the chord of wing 19) for high lift at low speed.

Figure 4A:
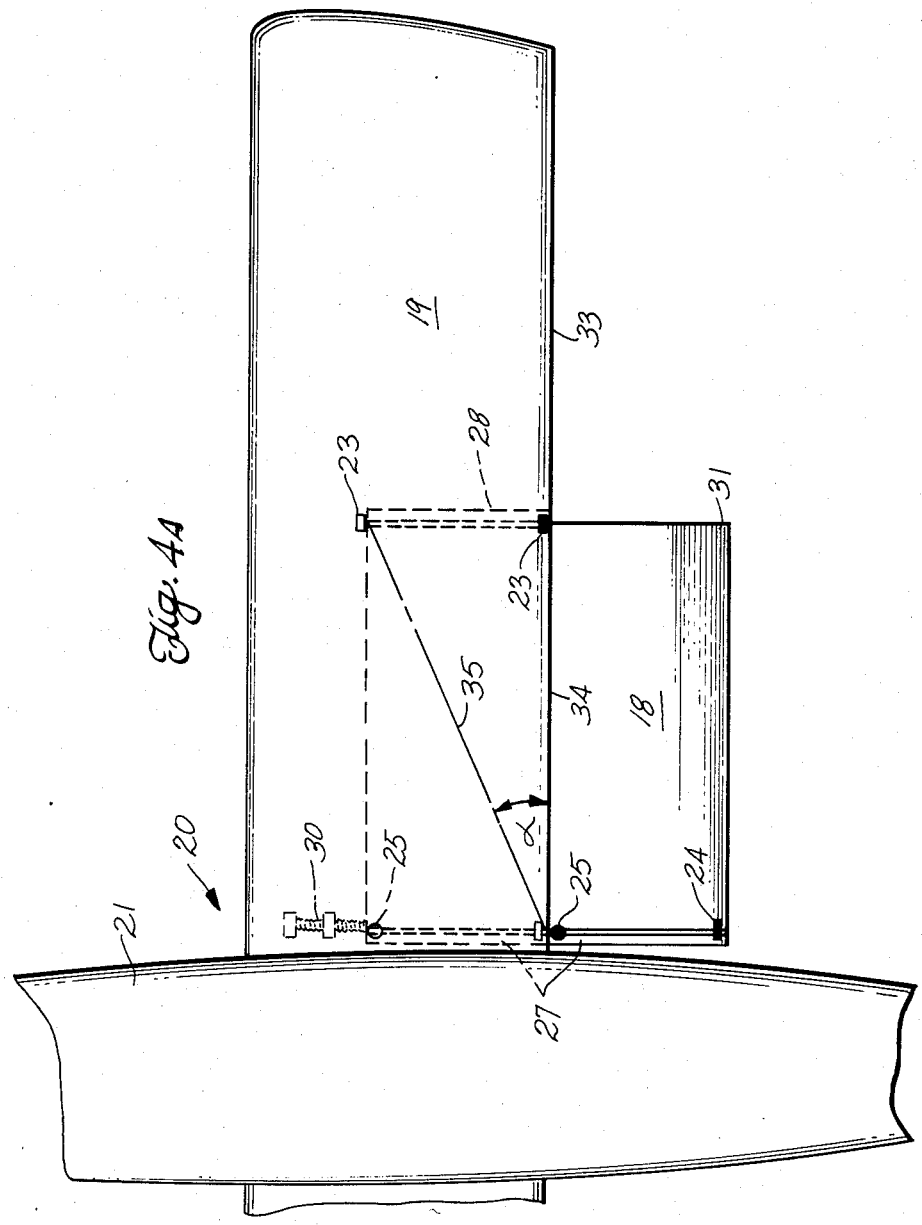
FIG. 4A is a top view of an aircraft using the new flap, the flap being shown extended in solid line, and retracted in phantom line.

FIG. 4A shows flap 18 and straight (unswept) wing 19 as components of an aircraft 20 with a fuselage 21. Couplers 23, 24, and 25 are respectively secured to the outboard-forward, inboard-aft, and inboard-forward corners of the flap. The couplers are described below, and they connect the flap to inboard and outboard flap tracks 27 and 28 which support the flap and guide its movement between the extended and retracted positions when driven by an in-wing actuator 30. A coupler is not used at outboard-aft corner 31 of the flap.

In FIG. 4A and subsequent drawings, couplers 23 and 24 are shown as solid rectangles in the extended flap position, and coupler 25 shown as a solid circle. The same notation is used for the couplers on the phantom-line retracted flap, but the respective rectangles and circles are open (not solid) to show the coupler position on the retracted flap.

The flap tracks may be of a conventional type, with the important exception that only inboard track 27 extends rearwardly and downwardly behind trailing edge 33 of wing 19. Outboard track 28 is contained entirely within the wing, and does not cause aerodynamic drag when the flap is retracted for cruising flight. To achieve an even greater drag reduction in cruise flight, the inboard flap track may be flush mounted in the side of the aircraft fuselage as described below.

To insure smooth operation of the flap, it is important to design the flap system with a relatively large angle alpha (FIG. 4A) between an axis 34 perpendicular to the flap track which extends rearwardly from the wing trailing edge, and a second axis 35 extending between outboard-forward and inboard-aft couplers 23 and 24 (shown in FIG. 4A with the flap in a phantom-line retracted position). Angle alpha should preferably be at least 30 degrees or greater, and this angle is affected favorably by use of a wide flap chord which also produces high lift when the flap is deployed. Angle alpha can also be increased by selecting a relatively large chord-to-span ratio for the flap.

A relatively large (as compared to conventional flaps) angle alpha automatically results from use of a flap 18A of this invention in a forward-swept wing 19A mounted on a fuselage 21A of an aircraft 20A as shown in FIG. 4B. Forward sweep, a wing design configuration of increasing interest in modern high-performance aircraft, in effect rotates coupler-to-coupler axis 35A in a direction favorable to increasing angle alpha between axes 34A and 35A. The other flap-system components correspond to those shown in FIG. 4A, including couplers 23A–25A, tracks 27A and 28A, and actuator 30A.

Couplers 23–25 are an important aspect of the invention in that they are designed to provide specific degrees of freedom or axes of movement for the flap as supported by the couplers connected to the flap tracks. Outboard-forward and inboard-aft couplers 23 and 24 constrain the flap against movement both vertically and laterally (i.e., in directions parallel to the yaw and pitch axes of the aircraft respectively), whereas inboard-forward coupler 25 provides only vertical support and movement constraint, while permitting limited freedom of lateral movement. Many different coupler configurations can be used, and several specific styles are shown in FIGS. 5AB, 6, and 7AB.

An outboard-forward coupler 23B is shown in FIG. 5A, and is connected between a rod-like outboard flap track 28B (supported only at its ends within the aircraft wing by conventional brackets which are not shown) and a wide-chord flap 18B. The coupler has a tube 37 slidably fitted on track 28B, and a pin 38 is rigidly secured to and extends laterally inboard from the inner side of the tube.

A fitting 39 of coupler 23B has a cylindrical bore 40 in which pin 38 is rotatably fitted so the fitting can pivot about the pin. The rear part of the fitting defines a slot 41 forming a clevis yoke which receives the forward end of a bar 42, the rear end of the bar being rigidly secured to the outboard-forward corner of the flap. A pin 43 through the clevis yoke pivotally secures the bar to the fitting.

As suggested by the arrows in FIG. 5A, the coupler has rotational freedom around pins 38 and 43, and linear fore-and-aft sliding freedom on flap track 28B. The outboard-forward flap corner, however, is constrained against vertical and lateral movement by the fitting, and is thereby fully supported on the flap track.

A very similar arrangement is shown in FIG. 5B, with the exception that tube 38 is replaced by a slider 45 having a pair of laterally spaced-apart flanges 46 between which are fitted upper and lower parallel rails 47 and 48 which are vertically spaced apart to form a different style of outboard in-wing flap track. The rails are supported at their ends by conventional brackets (not shown) secured to the wing internal structure, and captive slider 45 moves freely fore and aft along the flap-track rails when the flap is retracted or extended.

To insure smooth flap operation, particularly in a forward-swept wing, the flap leading edge should have a small degree of rotational freedom about the longitudinal axis of the adjacent flap track to accommodate misalignment or structural flexing of the flap. This movement is provided in the couplers shown in FIGS. 5A and 5B in that tube 37 can rotate on track 28B, and slider 45 is configured to fit only loosely within rails 47 and 48.

The couplers shown in FIGS. 5A and 5B are also suitable for use at the inboard-aft corner of flap 18B. As shown in FIG. 6, an inboard-aft coupler 24B corresponds to coupler 23B, with the exception that bar 42 is rigidly secured to and extends rearwardly from the inboard trailing edge of the flap. Inboard flap track 27B can be mounted within and extended rearwardly from the root of the aircraft wing, or can be substantially flush mounted in the fuselage side for reduced drag.

The coupler configuration shown in FIG. 5B, or any equivalent connecting system, can also be used to form the connection between the inboard flap track and the inboard-aft corner of the flap. In either case, the inboard-aft corner is supported and constrained vertically and laterally, while being free to slide fore and aft along the flap track, and to have limited rotational freedom about pins 38 and 43.

Referring to FIG. 7A, an inboard-forward coupler 25B is somewhat similar to the couplers described above, but is distinguished therefrom in that it provides limited lateral freedom of the inboard-forward corner of flap 18B with respect to fixed inboard track 27B. The lack of lateral stiffness and support in coupler 25B eleminates jamming of the flap during extension or retraction which might otherwise occur due to tolerance buildups in the lateral direction, airloads, or structure-flexing temperature changes.

Coupler 25B has a tube 51 slidably mounted on inboard track 27B, and a pin 52 is rigidly secured to and extends laterally outboard from the tube. A fitting 53 has a central cylindrical bore 54 receiving pin 52 so the fitting is pivotally mounted on the pin. A rearward extension of the fitting defines a slot 55 forming a clevis yoke receiving the forward end of a link or bar 56 pivotally secured to the fitting by a pin 57.

A pair of vertically spaced lugs 59 are rigidly secured at the inboard-forward corner of flap 18B to form a clevis yoke receiving the rear end of bar 56. These components are pivotally connected by a pin 60 fitted through the lugs and bar.

A rod 61 is rigidly secured to and extends inwardly toward the fuselage from the inboard side of tube 51. A rod-end bearing 62 on an actuator shaft 63 is rotatably fitted on rod 61, and shaft 63 is in turn connected to any suitable style of linear actuator (not shown) which may be a jack screw, hydraulic cylinder and piston, or a simple cable drive. Fore and aft movement of the actuator shaft results in fore and aft movement of coupler 25B to retract or extend the flap.

A very simple style of inboard-forward coupler 25C is shown in FIG. 7B. This coupler includes a block 66 with upper and lower parallel faces 67 and 68 making a slip fit between a pair of vertically spaced parallel rails 69 defining an inboard flap track 27C on the aircraft fuselage. A pin 70 extends inwardly from block 66 for connection to a flap-actuating cable 71 which may be power driven or manually operated.

Another pin 73 is rigidly secured to and extends outboard from block 66. A fitting 74 is rigidly secured to and extends forwardly from the inboard-forward corner of flap 18B. A cylindrical bore 75 extends laterally through the fitting to receive pin 73 so the fitting is rotatably mounted on the pin. Limited lateral freedom of the inboard-forward flap corner with respect to the inboard flap track is provided by the freedom of block 66 to slide both longitudinally and laterally between rails 69. The flap corner, however, is fully supported vertically and constrained against vertical movement with respect to the adjacent flap track.

A particular advantage of the invention is that it makes possible the use of flap tracks formed of inexpensive and simple straight track segments. Nonsegmented curved conventional tracks can also be used, but are more difficult and costly to make as compared to straight segments of tubes, rods, or rails. FIGS. 8A and 8B schematically illustrate the path of movement of the flap as guided by straight tracks, and these views look toward the fuselage at a section of the left aircraft wing.

Referring first to FIG. 8A, a wide-chord flap 18D is shown fully retracted in a well 73 of a left wing 19D. Only an inboard flap track 27D is shown, and it is segmented into a forward track 74 and an aft track 75, both of which are preferably secured to the side of the aircraft fuselage. The inboard track segments, as well as the unsegmented straight outboard track which is not shown, are simple straight channels, rods, or other forms of conventional track cross-sectional shapes. Inboard-forward coupler 25D is shown engaged at the front end of forward track segment 74, and inboard-aft coupler 24D is engaged at the front of aft track 75.

FIG. 8B shows the flap in the fully extended position. Inboard-forward coupler 25D has been driven to the rear end of forward track 74, and inboard-aft coupler 24D to the rear end of aft track 75. The rearwardly downward orientation of aft track 75 (as compared to the relatively level orientation of the forward track) guides the trailing edge of the flap rearwardly and downwardly into a high-lift position, and the leading edge of the flap is free to rotate (parallel to the aircraft pitch axis) during flap deployment due to the design of the couplers as already described.

FIG. 9 shows the flap drive system as installed on a light airplane 20E having a fuselage 21E and wing 19E. An inboard flap track 27E has a forward segment 78 and an aft segment 79, and at least the exposed aft segment is flush mounted on the fuselage side behind the wing. An outboard flap track 28E is concealed within the wing. Couplers 23E, 24E, and 25E connect three of the flap corners to the tracks, and the outboard-aft corner 31E of the flap is unsupported.

FIG. 11 shows the new flap system as applied to a jet-powered transport aircraft 20F having a fuselage 21F; a forward-swept aft-mounted main wing 19F, and a second forward-swept canard wing 80 mounted toward the front of the fuselage. Inboard and outboard flap tracks 27F and 28F are provided for both wings, and wide-chord flaps 18F are supported on the tracks by couplers 23F, 24F, and 25F of the type already described. The inboard tracks are preferably fuselage mounted, enabling the flap actuators to be positioned within the fuselage and eliminating the mechanical complexity of cables or actuators in the wing.

The flap system is not limited to use with constant-chord flaps, and FIG. 12 shows a tapered-chord flap 18G mounted on a forward-swept wing 19G of an aircraft 20G with a fuselage 21G. If the flap chord is reduced toward the outboard tip as shown, the root must be moved a greater distance than the tip during deployment if the flap leading edge is to be aligned with and parallel to the trailing edge of the wing, this being the preferred position of the extended flap for maximum aerodynamic lift.

Achieving greater movement of the flap root than the tip is simple in the new flap system, and requires only that the inboard and outboard flap tracks 27G and 28G be nonparallel as shown in FIG. 12. The nonparallel tracks force the flap to rotate about its vertical axis as it moves rearwardly, resulting in less motion at the tip than at the root, and resulting in the desired alignment of the leading edge of the deployed flap with the wing trailing edge. The usual couplers 23G–25G support the flap on the tracks, and the entire system is very simple as compared to prior-art systems for deploying tapered flaps.

It is important that the flap be designed with high torsional stiffness in view of the lack of structural support at the outboard-aft corner. The desired stiffness and strength is most easily achieved by using composite materials to make the flap. Such composite materials are typically high-strength fibers (fiberglass strands, carbon fibers, and the like) bound in a matrix of epoxy or polyester resin. The resulting structural stiffness enables use of the three-point flap support described above, and the flap is able to withstand the torsional aerodynamic loads applied when the flap is deployed.

A particular advantage of the invention is that only a single-point actuation system is needed, as compared to the heavy and complex multiple electric or hydraulic actuators needed to drive large Fowler flaps on conventional aircraft. Single-point actuation is made possible by the specific types of couplers described above which accommodate minor misalignments of the flap, and the absence of support of the flap outboard-trailing corner.

FIG. 10 shows a very simple cable-drive flap actuator as used with a flap 18H on a forward-swept wing 19H of a small aircraft 20H with a fuselage 21H. Couplers 23H–25H support the flap in inboard and outboard tracks 27H and 28H, and the inboard track, though preferably fuselage mounted for drag reduction, is shown for clarity of illustration as an external track extending rearwardly from the wing.

A first pulley 82 is mounted within the wing forwardly of inboard-forward coupler 25H when the flap is fully retracted. A second pulley 83 is mounted within inboard track 27H aft of coupler 25H when the flap is fully extended. A third pulley 84 is mounted in the wing ahead of the inboard track and spaced inboard and rearwardly from first pulley 82. A cable 85 extends around the three pulleys and the cable ends extend into the fuselage for connection to a drive mechanism (not shown) which can be a power-operated rotary actuator, or a simple manually driven handwheel.

Cable 85 is secured to inboard-forward coupler 25H, and the coupler is forced to follow any movement of the cable. The flap is thus extended or retracted by moving the cable in an appropriate direction, and only a singlepoint attachment to the flap is needed.

Single-point actuation is made possible by the design of couplers 23–25, two of which provide lateral support to resist aerodynamic forces tending to rotate the flap about its vertical axis. The flap will not bind laterally because it is free to move laterally at its inboard-forward corner. Fore and aft loads are reacted at the laterally stiff couplers by lateral loads which force the flap to move straight along the tracks during deployment. Single-point actuation at the inboard or outboard couplers, or at any position along the flap span, is smooth and reliable due to the coupler design and use of a relatively large angle alpha which avoids binding.

The invention is also applicable to aircraft with rearwardly swept wings, but with a modified arrangement of flap tracks and couplers to provide the desired angle alpha of 30 degrees or more. FIG. 13 shows an aircraft 20H with a fuselage 21H supporting a rearwardly swept wing 19H on which is mounted a wide-chord flap 18H.

An inboard flap track 27H is mounted within the wing, and does not extend rearwardly beyond the wing trailing edge. An outboard flap track 28H is also supported by the wing, and this track extends aft from the wing to guide and support the extended flap. If the aircraft has other structure extending back from the wing (such as a tail boom, engine nacelle, etc.), the outboard track may also be flush mounted in such structure. Any conventional type of actuator (not shown) may be used to extend and retract the flag.

Vertically and laterally stiff couplers 23H and 24H connect the outboard aft and inboard forward flap corners to tracks 28H and 27H respectively. Vertically stiff and laterally free coupler 25H connects the outboard forward flap corner to track 28H. The remaining inboard aft corner of the flap is unsupported. As shown in FIG. 13, this arrangement provides a large angle alpha between axis 34H perpendicular to aft-extending track 28H and axis 35H between the two diagonally opposite laterally stiff couplers. As in the other arrangements described above, the remaining forward flap corner is supported by the laterally free coupler, and the remaining aft flap corner is unsupported.

Although described in terms of a Fowler flap system, the invention is applicable to support and deployment of other types of lift-augmentation surfaces such as leading edge devices. Terms such as fore and aft are used for clarity with respect to the primary application of trailing-edge flap support, and must be reversed when the invention is applied to leading-edge devices which are deployed forwardly from the wing.

There has been described a new flap system which enables installation of wide-chord Fowler flaps and other lift-augmentation devices on an aircraft wing. In contrast to conventional Fowler flaps (FIG. 1) which typically increase wing lift by about 50 to 70 percent, a wide-chord flap (FIG. 3) can increase wing lift by about twice or two-and-one-half times the lift of a clean retracted-flap wing. The system is characterized by simplicity and low drag, and it is well adapted for use in both small and large aircraft using a variety of wing configurations.

What is claimed is:

1. A lift-augmentation system for an aircraft wing, comprising:
 a lift-augmentation device of generally quadrilateral planform to define four corners;
 first and second tracks on the aircraft for supporting the device to be movable between extended and retracted positions on the wing, the device having a first spanwise edge which is remote from the wing and a second spanwise edge which is adjacent the wing when the device is in the extended position;
 first and second couplers disposed at diagonally opposite corners of the device and connecting such corners to the first and second tracks respectively, the first and second couplers providing vertical and lateral support for the device at such corners;
 a third coupler disposed at the remaining corner of the second edge of the device, the third coupler providing vertical support and at least limited lateral freedom for the device, the remaining corner of the first edge of the device being unsupported; and drive means connected between the aircraft and device for extending and retracting the device along the tracks.

2. The system defined in claim 1 wherein the first track extends from the aircraft to support the first coupler and associated corner of the first edge when the device is extended, and the second track does not extend chordwise beyond the aircraft wing.

3. The system defined in claim 2 wherein the device is constructed of composite materials to be torsionally stiff.

4. A flap system for an aircraft having a wing, comprising:
 a flap having leading and trailing edges, and inboard and outboard ends, the flap having two forward corners and two aft corners defined by junctions of the edges and ends;
 first and second flap tracks on the aircraft;
 a first coupler connecting one of the forward corners to the first flap track;
 a second coupler connecting the aft corner which is diagonally opposite said one forward corner to the second flap track;
 a third coupler connecting the remaining forward corner to the second flap track, the remaining aft corner being unsupported;
 the first and second couplers providing vertical and lateral support for the associated corners, and the third coupler providing vertical support and at least limited lateral freedom for the associated corner; and
 drive means on the aircraft for moving the flap along the tracks between extended and retracted positions.

5. The system defined in claim 4 wherein an angle between a first axis perpendicular to the second flap track and a second axis connecting said diagonally opposite corners is at least 30 degrees.

6. The system defined in claim 5, wherein the second flap track extends aft from the wing trailing edge, and the first flap track terminates adjacent the wing trailing edge.

7. The system defined in claim 5, wherein the wing is rearwardly swept, and the second flap track is outboard of the first flap track.

8. The system defined in claim 5 wherein the wing is forwardly swept, and the second flap track is inboard of the first flap track.

9. The system defined in claim 8 wherein the second flap track is mounted on the fuselage of the aircraft, and the first flap track is contained within the wing.

10. The system defined in claim 7 or 8 wherein the flap has a chord dimension which is at least one-half of a chord dimension of the wing at a corresponding spanwise location.

11. The system defined in claim 10, wherein the flap is constructed of composite material comprising resin-embedded fibers.

12. The system defined in claim 10, wherein the flap has a tapered chord, and the first and second flap tracks are nonparallel.

13. The system defined in claim 10 wherein the flap tracks comprise straight segments, each track having at least one segment.

14. The system defined in claim 10 wherein the drive means comprises a single actuator.

15. A flap system for an aircraft having a fuselage and a wing, comprising:
 a flap having leading and trailing edges, and inboard and outboard ends;
 inboard and outboard flap tracks on the aircraft;
 means connecting the flap to the flap tracks for movably supporting the flap on the aircraft, including first and second couplers respectively connecting the outboard forward corner to the outboard track, and the inboard aft corner to the inboard track, and a third coupler connecting the inboard forward corner to the inboard track;
 the first and second couplers constraining the respective corners against vertical and lateral movement with respect to the associated tracks, and the third coupler constraining the inboard forward corner against vertical movement while permitting limited lateral movement with respect to the inboard track;
 an angle between a first axis perpendicular to the inboard track and a second axis connecting the first and second couplers being at least 30 degrees; and
 drive means connected between the aircraft and flap for extending and retracting the flap along the tracks.

16. The flap system defined in claim 15 wherein the inboard track extends rearwardly behind a trailing edge of the wing, and the outboard track terminates at the trailing edge of the wing, the wing being selected from the group consisting of straight wings and forwardly swept wings.

17. The flap system defined in claim 16 wherein the flap is of composite construction, the drive means is a single actuator, and a chord dimension of the flap is at least one-half the chord dimension of the wing at corresponding spanwise locations.

* * * * *